Nov. 13, 1951 G. A. PEEL 2,575,120
BEAM HARVESTER CATCHER ATTACHMENT
Filed July 8, 1949 2 SHEETS—SHEET 1
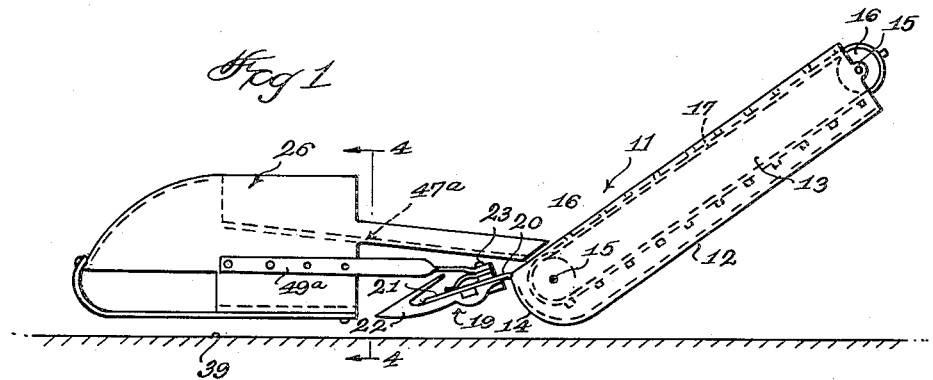
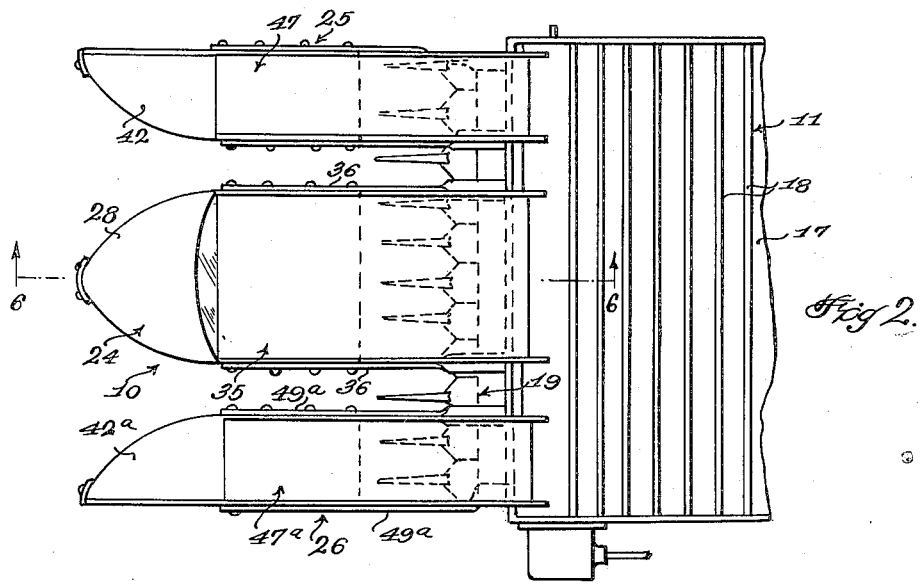
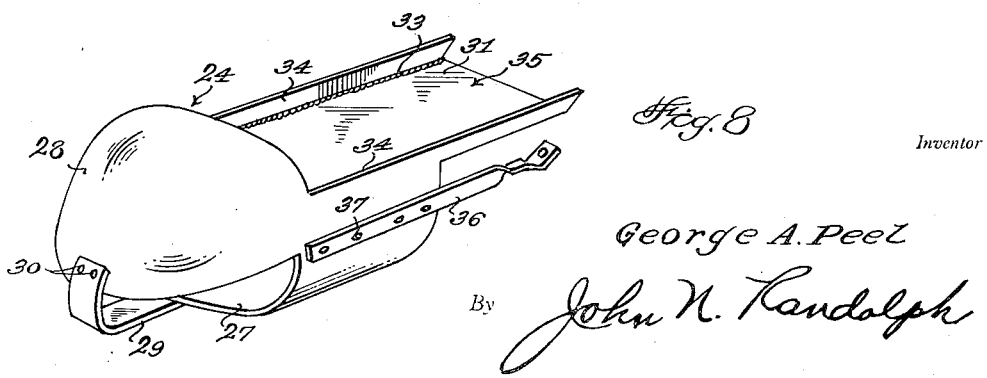
Inventor
George A. Peel
By John N. Randolph
Attorney Nov. 13, 1951 G. A. PEEL 2,575,120
BEAM HARVESTER CATCHER ATTACHMENT
Filed July 8, 1949 2 SHEETS—SHEET 2
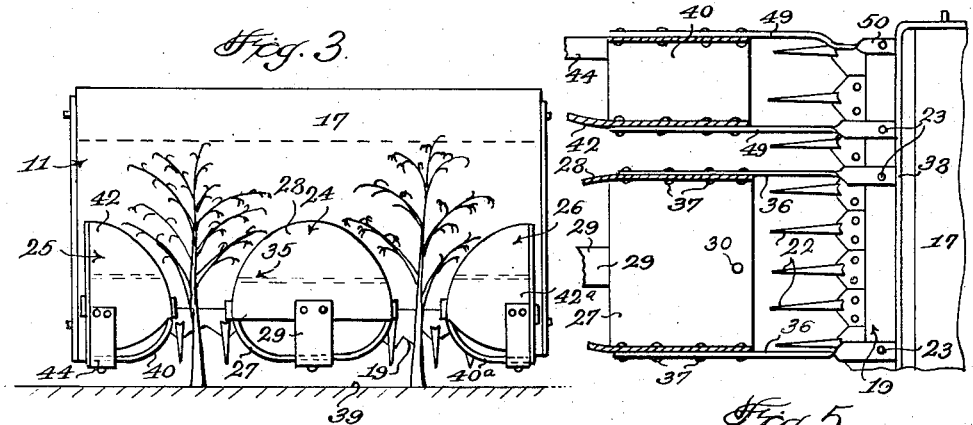
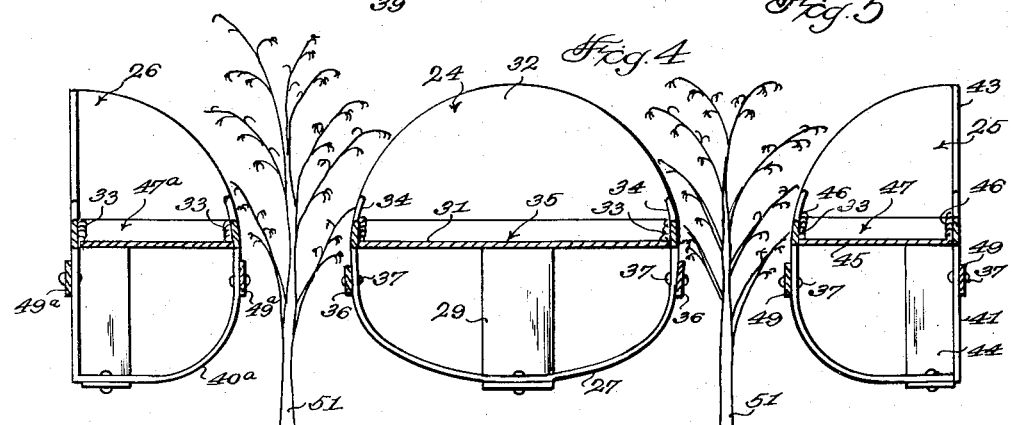
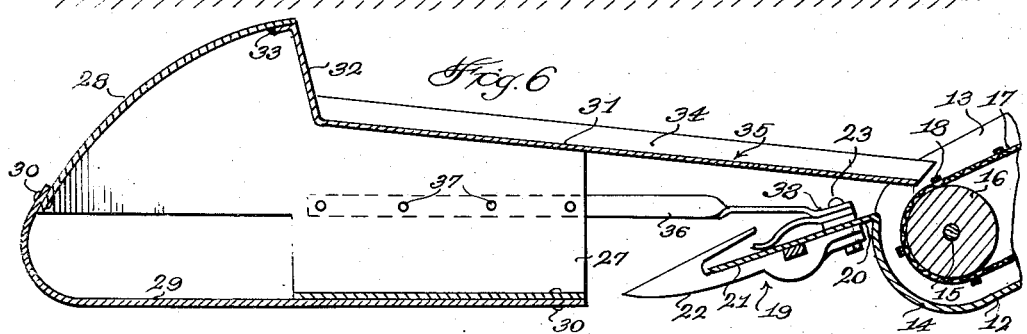
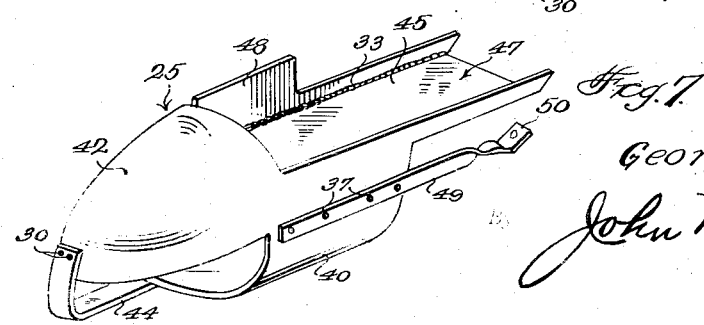
Inventor
George A. Peel
John N. Randolph
Attorney

Patented Nov. 13, 1951

2,575,120

UNITED STATES PATENT OFFICE 2,575,120

BEAN HARVESTER CATCHER ATTACHMENT

George A. Peel, Livingston, Calif.

Application July 8, 1949, Serial No. 103,671

5 Claims. (Cl. 56—23)

This invention relates to an attachment for use on harvesting machines when employed in harvesting beans, particularly soy beans.

Soy beans are conventionally harvested by a machine employing a reciprocating type sickle bar for cutting the bean stalks and from which the cut stalks fall onto an endless conveyor by which the stalks and beans are conveyed away from the sickle bar or cutter. The bean stalks being cut are shaken so that a considerable number of the beans fall from the stalks as they are being cut and forwardly of the conveyor and drop onto the ground and are thereby lost. This is particularly true in the fall after the beans are dry and particularly after a frost, with the loss running sometimes as much as twenty-five percent of the total yield of the plants.

Accordingly, it is a primary object of the present invention to provide an attachment for use on such harvesters when employed for harvesting beans and which will provide means for catching the beans which are thus shaken from the plants as they are being cut and for conveying such beans by gravity onto the endless conveyor to be conveyed away from the cutter with the stalks, thereby substantially eliminating completely this loss of the beans during harvesting.

A further object of the invention is to provide an attachment for the aforedescribed purpose of extremely simple construction which may be quickly and easily attached to or removed from a harvester and which may function therewith for catching the beans shaken from the plants where the harvester is employed for simultaneously harvesting plants of one, two or more rows.

A further object of the invention is to provide a bean harvesting attachment which may be readily adjusted for accommodating the attachment to bean rows of different widths and will additionally function for raising bean stalks or plants to substantially upright positions to enable the plants to be more readily cut by the harvester and which will additionally assist in directing the cut plants onto the harvester conveyor.

Various other objects and advantages of the invention will hereinafter become more fully apparent from the following description of the drawings illustrating a presently preferred embodiment thereof, and wherein:

Figure 1 is a side elevational view of a harvester showing the attachment applied thereto;

Figure 2 is a top plan view of the attachment shown applied to the forward end of the harvester;

Figure 3 is a front elevational view of the attachment in an applied position and illustrating it in relationship to two rows of plants being harvested;

Figure 4 is an enlarged cross sectional view of the harvester attachment taken substantially along a plane as indicated by the line 4—4 of Figure 1;

Figure 5 is a fragmentary horizontal sectional view, partly in top plan, of a portion of the attachment and showing the manner in which it is applied to the harvester;

Figure 6 is an enlarged longitudinal sectional view taken substantially along a plane as indicated by the line 6—6 of Figure 2;

Figure 7 is a perspective view of one of the outer elements of the attachment, and Figure 8 is a similar view of the intermediate element or section of the attachment.

Referring more specifically to the drawings, for the purpose of illustrating a preferred application and use of the harvester attachment, designated generally 10 and comprising the invention, a portion of a conventional harvester is illustrated in Figures 1, 2, 5 and 6 and designated generally 11. The illustrated portion of the harvester 11 includes a pan 12 having upstanding side walls 13. The pan 12 is provided with an upwardly and forwardly rounded lower end 14. A shaft 15 extends transversely between and through the side walls 13 adjacent each end of the pan 12 and a roller 16 is secured to each shaft 15 and disposed between said side walls 13. An endless conveyor 17 is trained over the rollers 16 and is provided on its exterior with longitudinally spaced transversely extending slats 18. A reciprocating type cutter bar 19 is mounted on a forwardly extending lip or extension 20 of the forward end of the pan 12 and which is inclined downwardly and forwardly. The cutter bar 19 includes a reciprocating sickle 21 and spaced, forwardly extending finger guards 22 which are detachably mounted by nut and bolt fastenings 23, forming a part of the reciprocating cutter 19 and which extend through the supporting lip or flange 20. The endless conveyor 17 and its supporting pan or platform 12 is inclined upwardly and rearwardly from the reciprocating cutter 19 and said platform or pan 12 is adapted to be pivotally supported in any suitable manner, not shown, at its upper, rear end on a prime mover of the harvester, not shown, so that the pan or platform 12 and the endless conveyor 17, carried thereby, may swing upwardly and forwardly or downwardly and rearwardly. Suitable drive means is provided for the endless conveyor 17 and the reciprocating sickle 21, which constitutes no part of the present invention and which, being conventional, has not been illustrated. The parts 11 to 23, inclusive, constitute no part of the present invention but merely illustrate parts of a conventional harvester with which the attachment 10 is adapted to be used and as the description proceeds it will be readily apparent that said attachment 10 may be utilized with other types of harvesters than the harvester 11, as in conjunction with a conventional type harvester wherein the endless conveyor or draper extends transversely rather than longitudinally of the direction of travel of the harvester.

The attachment 10, as illustrated in the drawings, is intended for use with a harvester 11 of a width for simultaneously harvesting two adjacent plant rows and includes an intermediate section 24, an outer right-hand section 25 and an outer left-hand section 26, looking in the direction of travel of the harvester 11. The attachment sections 24, 25 and 26 are formed of relatively lightweight sheet metal and said intermediate section 24, as best illustrated in Figures 2, 4, 6 and 8 includes a downwardly and transversely bowed longitudinally extending bottom portion 27, the corresponding sides of which are provided with integral upwardly and forwardly projecting extensions which are integrally formed and shaped to provide a transversely and longitudinally rounded forward end or nose 28. A strap 29 extends longitudinally on the underside of the bottom portion 27 and has an upturned forward end which is secured to the lower, forward end of the nose 28, said strap 29 being secured to the portions 27 and 28 by any suitable means such as the fastenings 30. A relatively wide strip of sheet metal 31 forming a platform is disposed between the upwardly extending side portions of the body portion 27 and has an upturned forward end 32 which is disposed within the upper rear portion of the nose 28. Said portions 31 and 32 being suitably secured as by welding, as seen at 33, to the body portion 27 and nose 28. The strip or platform 31 is inclined downwardly and rearwardly and extends a substantial distance beyond the rear end of the body portion 27. The upper edge portions of the sides of the body portion 27 extend to above the platform 31 and are provided with rear extensions combining therewith to form upstanding side walls 34, disposed at either side of the platform 31 and combining therewith to form a downwardly and rearwardly inclined chute, designated generally 35 and which is open at its rear end. A substantially rigid strap member 36 is secured to the outer side of each side wall of the body portion 27 by fastenings 37 and extends rearwardly therefrom and is provided with a twisted and upturned apertured rear end 38 which is adapted to be detachably disposed on the cutter bar 19, as clearly illustrated in Figures 1 and 6 and the aperture of which is adapted to detachably receive one of the cutter bar fastenings 33 for demountably supporting the section 24 on the cutter bar 19 by its two straps 36 and so that the attachment section 25 will extend forwardly from the cutter bar and will be supported above and substantially parallel with the ground over which the harvester is traveling, as indicated at 39 in Figures 1, 3 and 4. It will also be apparent that the trough 35 extends rearwardly and downwardly over the reciprocating cutter 19 and has its open lower end disposed to discharge onto the upper flight of the endless conveyor 17 which is driven in a direction to move upwardly and rearwardly.

The right-hand attachment section 25, as best seen in Figures 2, 3, 4, 5 and 7 constitutes substantially the equivalent of one longitudinal half of the intermediate attachment section 24 having an inwardly facing half rounded body portion 40 on the inner side thereof terminating in an upstanding outer side wall 41 and having integral portions forming a half rounded forward end or nose 42, which is rounded on its inner side and substantially flat and upright on its outer side, as seen at 43. The bottom portion 40 and the forward end of the nose 42 are connected by a strap 44, corresponding to the strap 29 and which is similarly secured by fastenings 30 and disposed adjacent to the outer, flat side of the attachment section 25. A strip 45 together with extensions 46 of the upper edges of the body portion 40 and the outer upright side 41 combine to form a downwardly and rearwardly extending chute or trough, designated generally 47 which corresponds to the chute or trough 35 except that at least the forward end portion of its outer side wall 46 is provided with an upper extension 48. The attachment section 25 is provided with supporting straps 49 which are secured to the sides thereof by additional fastenings 37 and which extend rearwardly and are provided with ends 50 corresponding to the rear strap ends 38 and which are similarly secured by other fastenings 23 to the cutter bar 19 for mounting the attachment section 25 in the same relationship as the attachment section 24 to the harvester 11 and in laterally spaced, substantially parallel relationship to said attachment section 24, as clearly illustrated in Figures 2 and 3.

The other outer section 26, corresponds in every detail, to the section 25 except that the rounded side is the right-hand side rather than the left-hand side thereof looking from rear to front of the attachment 10, or as illustrated in Figure 4 and wherein the body portion is designated 40a, the nose 42a, the chute 47a and the supporting straps 49a. The attachment section 26 is likewise mounted in the same manner and is laterally spaced from the other side of the intermediate harvester attachment section 24.

From the foregoing it will be readily apparent that the attachment 10, as illustrated is intended to be used on the harvester 11 for simultaneously harvesting two adjacent parallel rows of bean plants and the spaces between the attachment sections 24 and 25 and the attachment sections 24 and 26 are properly spaced so that plants of the two rows may be received in said spaces as the harvester 11 is moved forwardly or from right to left of Figures 1 and 2. Obviously, this spacing of the attachment sections 24, 25 and 26 may be varied by securing their supporting straps to different fastenings 23 of the cutter bar 19 for accommodating the attachment 10 to plant rows spaced different distances apart.

As the harvester 10 moves along the parallel plant rows to be harvested the bean plants 51, as seen in Figures 3 and 4, will enter the attachment between the sections 24, 25 and 26 and the nose portions 28, 42 and 42a, respectively, thereof will tend to lift the plants 51 which are hanging low to the ground and to guide said plants into the spaces between the attachment sections and toward the cutter bar 19. As the plant stalks are struck by the reciprocating sickle 21 of the cutter bar 19, said plants are shaken so that a considerable number of the beans, not shown, will be shaken therefrom as the stalks are cut off before said stalks or plants fall onto the upper flight of the endless conveyor or draper 17. Where soy beans are being harvested particularly in the fall when the beans are dried and after a frost, as much as twenty-five percent of the entire yield of beans will thus be shaken off from the plants as they are cut by the cutter bar 19 and which beans would ordinarily fall on the ground in advance of the conveyor or draper 17 and would thus be left in the field and lost. However, as the plants 51 are disposed in overhanging relationship to the troughs or chutes 35, 47 and 47a when the stalks or plants are cut off, the beans thereby shaken from the plants will fall into said chutes or troughs and will be conveyed by gravity downwardly and rearwardly onto the upper flight of the conveyor or draper 17 and will be conveyed into the machine along with the harvested plant so that there will be substantially no loss of beans during the harvesting thereof.

Obviously, for wider harvesters capable of simultaneously harvesting more than two plant rows, additional intermediate sections 24 may be utilized. As the attachment sections 24, 25 and 26 will be subjected to no wear they may be made of relatively light gauge metal so that they will be extremely light in weight and accordingly may be readily supported on the cutter bar 19.

Various modifications and changes are contemplated and may obviously be resorted to, without departing from the spirit or scope of the invention as hereinafter defined by the appended claims.

I claim as my invention:

1. An attachment for harvesting machines used in harvesting bean plants comprising a plurality of separate attachment sections, each of said sections having rearwardly extending supporting members each having a rear end adapted to be detachably fastened to a stationary part of a reciprocating cutter of a harvester, said attachment extending forwardly from said reciprocating cutter and having the sections thereof disposed in transversely spaced, substantially parallel relationship, each of said sections having a rounded nose or forward portion and a longitudinal trough extending rearwardly therefrom and inclined downwardly and rearwardly, said troughs extending rearwardly over the cutter bar and having open rear discharge ends adapted to discharge onto the upper flight of an endless conveyor or draper of the harvester.

2. A harvester attachment as in claim 1, said nose portions being rounded and convexed on their upper sides and both longitudinally and laterally thereof.

3. An attachment as in claim 1, said attachment including an intermediate attachment section adapted to move between two rows of bean plants to be harvested simultaneously and outer attachment sections each adapted to be disposed on the other side of one of said bean rows, said outer attachment sections each being of substantially half the width of said intermediate attachment section and each having a rounded inner side and a substantially flat, upright outer side.

4. An attachment for use with harvesters for harvesting beans, comprising a plurality of attachment sections each adapted to be independently supported detachably on a stationary part of a harvester cutter bar and extending forwardly therefrom and disposed thereabove, said attachment sections being disposed in substantially parallel relationship and being laterally spaced from one another for straddling one or more rows of bean plants to be harvested and being laterally adjustable on the cutter bar for positioning said attachment sections for straddling the plant row or rows, and each of said attachment sections including a longitudinally extending trough, said troughs being inclined downwardly and rearwardly and extending from forwardly of the cutter bar over the cutter bar and having lower rear discharge ends adapted to open behind the cutter bar and over the upper flight of an endless conveyor or draper of the harvester, said troughs being adapted to receive beans shaken from the plants as they are cut and for conveying the beans to the endless conveyor or draper.

5. A harvester attachment, in combination with a bean harvesting machine having a forward end provided with a transversely disposed reciprocating cutter bar and an endless conveyor having a forward end disposed behind and adjacent said cutter bar and extending rearwardly therefrom, said attachment comprising a plurality of sections each independently secured to and detachably and adjustably supported on the stationary part of the reciprocating cutter bar and extending forwardly therefrom and disposed thereabove, said sections being disposed in substantially parallel transversely spaced relationship for straddling a row or rows of bean plants to be harvested, each of said sections including a longitudinally extending trough, said troughs being inclined downwardly and rearwardly and extending from forwardly of the reciprocating cutter bar over said cutter bar and having lower rear discharge ends opening behind the cutter bar and over the endless conveyor, said troughs being adapted to receive beans shaken from the plants as the plants are cut by the reciprocating cutter bar for conveying the loose beans to the endless conveyor.

GEORGE A. PEEL.

REFERENCES CITED

The following references are of record in the file of this patent:

UNITED STATES PATENTS

| Number | Name | Date |
| --- | --- | --- |
| 532,363 | Crough | Jan. 8, 1895 |
| 1,401,829 | Swindell | Dec. 27, 1921 |
| 1,604,458 | Luedke | Oct. 26, 1926 |
| 1,786,487 | George | Dec. 30, 1930 |
| 1,934,111 | Wilson | Nov. 7, 1933 |
| 2,050,792 | Hicks | Aug. 11, 1936 |